United States Patent [19]

Whitney

[11] Patent Number: 4,537,557
[45] Date of Patent: Aug. 27, 1985

[54] REMOTE CENTER COMPLIANCE GRIPPER SYSTEM

[75] Inventor: Daniel E. Whitney, Arlington, Mass.

[73] Assignee: The Charles Stark Draper Laboratory, Inc., Cambridge, Mass.

[21] Appl. No.: 371,197

[22] Filed: Apr. 23, 1982

[51] Int. Cl.$^3$ .............................................. B25J 17/02
[52] U.S. Cl. ...................................... 414/735; 901/45; 901/31; 414/729
[58] Field of Search ...................... 901/45; 414/730, 1, 414/753, 735; 33/169 C, 185 R; 29/407, 406, 464, 281.4; 294/86 R

[56] References Cited

U.S. PATENT DOCUMENTS

| | | | |
|---|---|---|---|
| 3,824,674 | 7/1974 | Inoyama et al. | 901/45 X |
| 3,885,295 | 5/1975 | Engelberger et al. | 901/45 X |
| 3,984,006 | 10/1976 | Takeyasu | 901/45 X |
| 4,098,001 | 7/1978 | Watson | 901/45 X |
| 4,155,169 | 5/1979 | Drake et al. | 901/45 X |
| 4,202,107 | 5/1980 | Watson | 33/169 C |
| 4,276,697 | 7/1981 | Drake et al. | 33/169 C |
| 4,324,032 | 4/1982 | Gustavson et al. | 29/407 |
| 4,337,579 | 7/1982 | DeFazio | 33/169 C |
| 4,400,885 | 8/1983 | Consales | 33/185 R |
| 4,414,750 | 11/1983 | DeFazio | 33/185 R |
| 4,439,926 | 4/1984 | Whitney et al. | 33/185 R |

FOREIGN PATENT DOCUMENTS 2556595 7/1976 Fed. Rep. of Germany .... 294/86 R

OTHER PUBLICATIONS

NASA Tech. Brief, p. 215, "Mechanical Hand for Gripping Objects", Clark et al., vol. 5, No. 2, Summer, 1980.
Computers in Industry, 1981, pp. 199–207, "Some Critical Areas in Robotics Research", Holzer, 10/1981.

Primary Examiner—Terrance L. Siemens
Attorney, Agent, or Firm—Joseph S. Iandiorio; William E. Noonan

[57] ABSTRACT

A remote center compliance (RCC) gripper system including: an erectable RCC device including a compliance unit having a plurality of compliance members; an articulated gripper mechanism interconnected with one end of the compliance unit and including a base having a generally centrally disposed joint and having a plurality of fingers extending therefrom; and apparatus for applying a force to the centrally disposed joint to fix the joint and erect the RCC device.

8 Claims, 10 Drawing Figures

REMOTE CENTER COMPLIANCE GRIPPER SYSTEM

FIELD OF INVENTION

This invention relates to a remote center compliance gripper system including a remote center compliance (RCC) device and a gripper mechanism in combination, and more particularly to such a system in which the gripper mechanism is an integral part of the RCC device.

BACKGROUND OF INVENTION

An RCC device and a gripper mechanism combination are conventionally arranged in a stacked array. The RCC device and gripper mechanism are separate units with the gripper mechanism suspended from the RCC device for gripping tools or workpieces to be manipulated.

An RCC device is a passive device for aiding insertion and mating maneuvers in robot machines, docking and assembly equipment. An RCC device establishes motion about a remote center of compliance typically at, near or beyond the functioning end of the operator member. The RCC device includes two structures concatenated or serially interconnected between the operator member and a mounting member. In one type of RCC, disclosed in FIG. 1 of U.S. Pat. No. 4,098,001, (hereinafter U.S. Pat. No. '001) one structure includes flexure means comprised of a number of discrete elements or radial members aligned with conical radii from a center which is the remote center of compliance of the device. The other structure includes flexure means composed of a number of discrete elements which are parallel to each other and which also have localized motion portions.

In another type of RCC device, as disclosed in FIG. 2 of U.S. Pat. No. 4,155,169, (hereinafter U.S. Pat. No. '169) the two structures each include flexure means which are generally flexible or deformable throughout. In one of the structures the flexure means are radial members arranged along conical radii from a center or focus, and that center typically is not coincident with the remote center of compliance of the device. In the other structure a laterally oriented member also includes flexure means which establish a second center or focus. The remote center of compliance is typically somewhere between the two centers or foci and each of the structures contributes to the rotational and the translational action of this type of RCC device. Thus in the RCC device of FIG. 2 of U.S. Pat. No. 4,155,169 both structures constitute a rotational portion, whereas in the RCC devices of U.S. Pat. No. 4,098,001 (FIG. 1) the radial member portion is identified with the rotational action.

In the RCC of U.S. Pat. No. '001, the location of the remote center is determined by the geometry of a plurality of radially disposed members whose focus is a point in space at which the remote center of compliance is located.

In the RCC device of U.S. Pat. No. '169 the location of the remote center is determined by the geometry and stiffness of the radial members as well as by the mechanical stiffness of a deformable element which supports the radial members.

In the RCC device shown in FIG. 2 of U.S. Pat. No. 4,337,579 at least a portion of the operator means is deformable and provides a first motion center. There is a deformable means for supporting the operator means to permit rotation about a projected second center and providing in conjunction with the operator means a remote center of compliance between the first and second centers at, near or beyond the end of the operator means. All of the above disclosures are incorporated herein by reference.

One shortcoming of present apparatus is that the gripper mechanism added on to the RCC device increases the required distance of the remote center of compliance from the RCC device. This is a problem because it is difficult to effectively project the remote center of compliance a large distance from the RCC device. For example, a typical workable distance is set at a ratio of 1:1 with the diameter of the RCC device. The attachment of a gripper mechanism to the RCC device typically compels an increased distance for the remote center of compliance. The separate gripper mechanism also adds size, bulk, cost, and increases the overall number of parts used.

SUMMARY OF INVENTION

It is therefore an object of this invention to provide an improved, combined, integral RCC gripper system.

It is a further object of this invention to provide such an RCC gripper system which requires fewer parts.

It is a further object of this invention to provide such an RCC gripper system which reduces the required distance of the remote center of compliance from the RCC device.

It is a further object of this invention to provide such an RCC gripper system which permits a smaller, more compact unit.

The invention results from the realization that a truly effective, smaller RCC gripper system can be made by combining the RCC device and gripper mechanism in a single integral unit with a rigid portion of the RCC device being formed selectively by a portion of the gripper mechanism.

The invention features an RCC gripper system including an erectable RCC device having a compliance unit with a plurality of compliance members. An articulated gripper mechanism includes a base having a generally centrally disposed joint and a plurality of fingers extending from the base. The base is interconnected with one end of the compliance unit. There are means for applying a force to the centrally disposed joint to fix the joint and erect the RCC device.

In specific embodiments the joint may include a pivot mechanism or a flexure. Each compliance member may be interconnected with the base proximate a finger; each compliance member includes a finger joint interconnected with the base; and the finger joint may include a pivot mechanism. Each compliance member may include a major motion portion at each end, or the compliance member may include an element which is deformable throughout.

DISCLOSURE OF PREFERRED EMBODIMENT

Other objects, features and advantages will occur from the following description of a preferred embodiment and the accompanying drawings, in which:

FIG. 1 is a schematic elevational diagram of an RCC gripper system according to this invention utilizing an RCC device of the type referred to in FIG. 1 of U.S. Pat. No. 4,098,001

Figure 1:
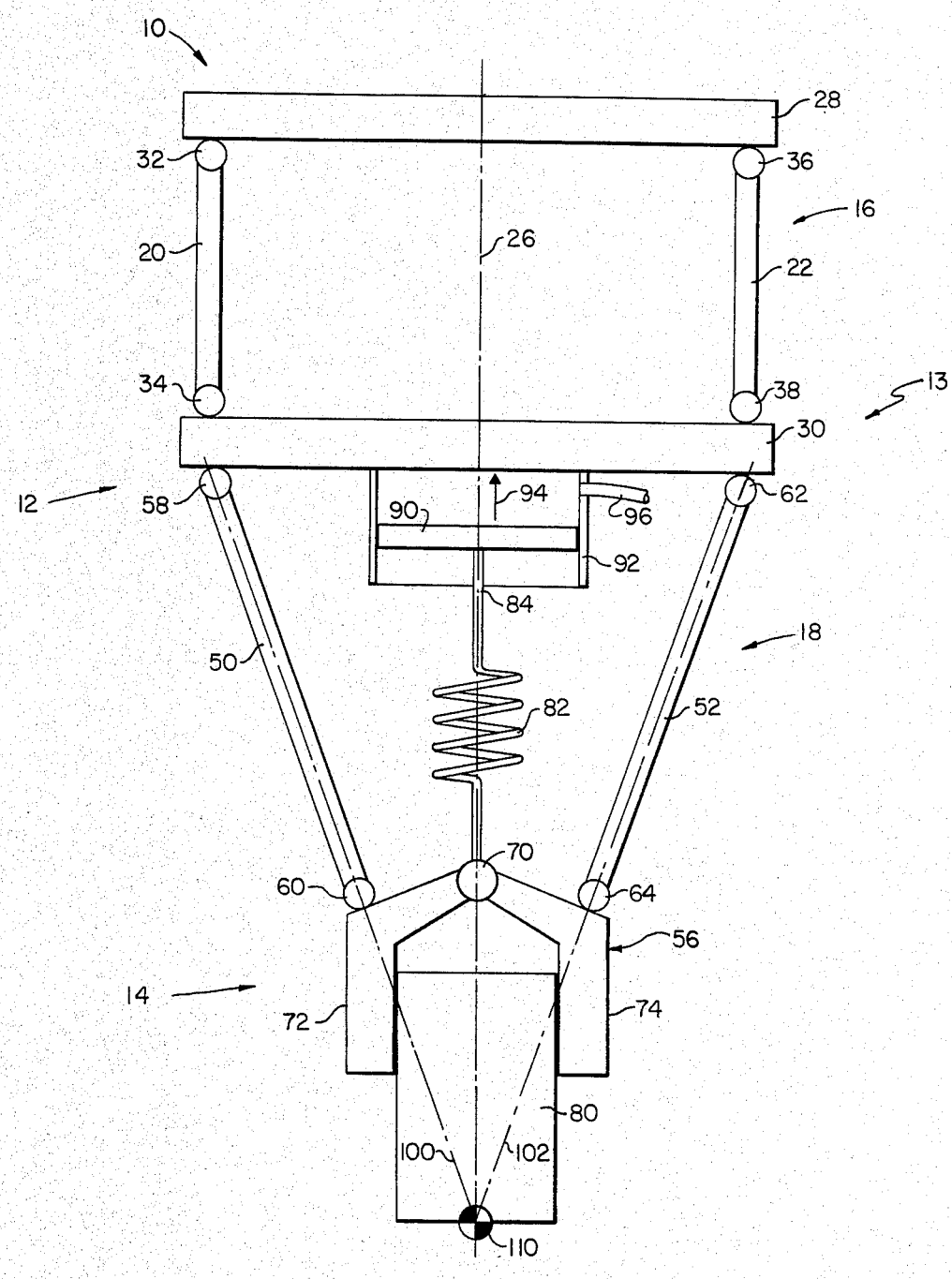
Figure 2:
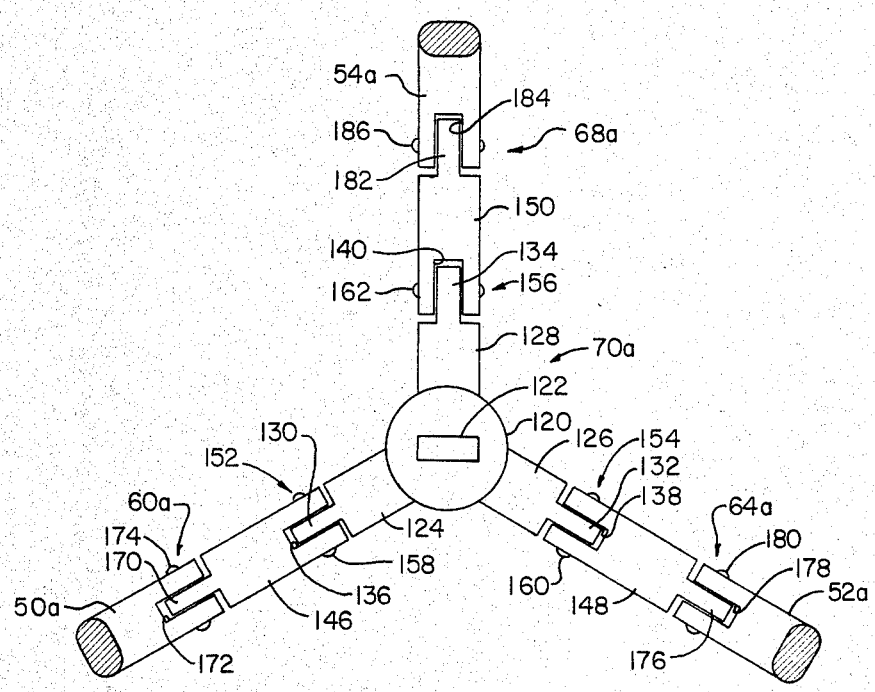
FIG. 2 is a plan view of the lower gripper portion illustrating one type of joint that may be used.
Figure 7:
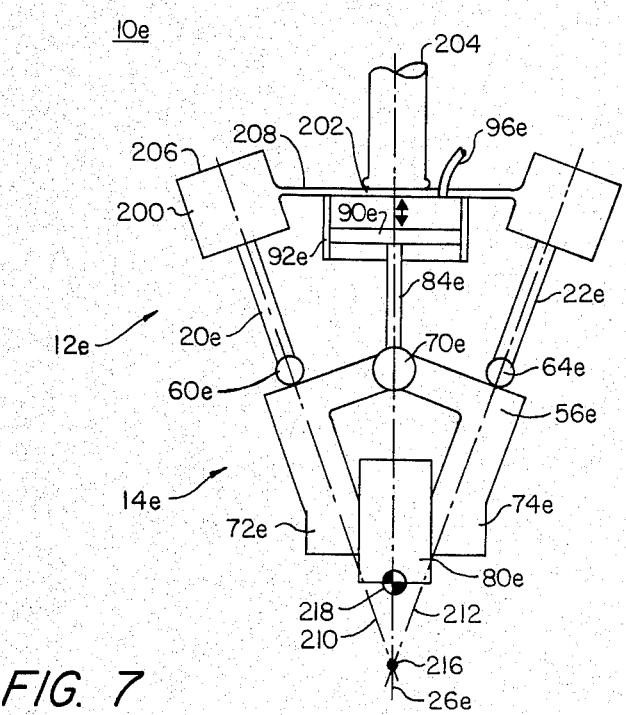
Figure 8:
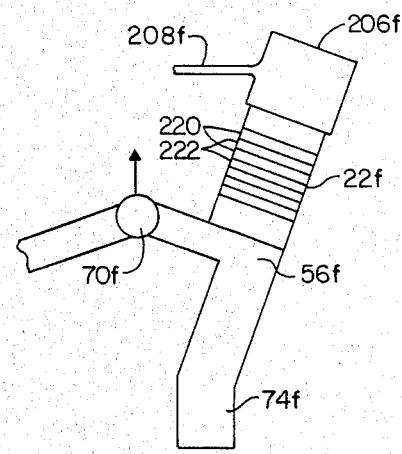
Figure 9:
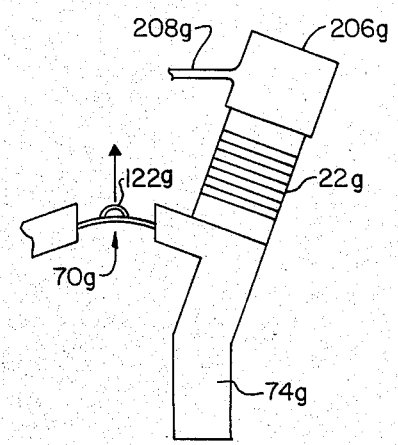

FIG. 7 is a view similar to FIG. 1 of an RCC gripper system according to this invention utilizing of RCC device shown in FIG. 2 of U.S. Pat. No. 4,155,169 referred to above;

FIG. 8 shows a portion of the system of FIG. 7 with the compliance members connected directly to the base; and FIG. 9 is a view similar to FIG. 8 showing a flexure implementation of the central joint.

There is shown in FIG. 1 an RCC gripper system 10 according to this invention including an RCC device 12 of the type described in U.S. Pat. No. 4,098,001, and a gripper mechanism 14 integrally formed therewith. RCC device 12 includes a compliance unit 13 having a translational portion 16 and a separate rotational portion 18. Translational portion 16 includes a number of compliance members 20, 22 (and 24, not shown) circumferentially spaced from one another and arranged symmetrically about central axis 26. Elongate compliance members 20, 22, and 24 are interconnected between a first support means 28, typically fixed to a machine or other device, and a second, intermediate support member 30, by means of joints 32, 34, 36, 38 (and 40, 42, not shown) which may be pivots, flexures, or other interconnection means that allow major motion (relative to motion along the remaining length of the compliance members) to occur at those joints. The term "major motion" indicates the relative motion which occurs between the compliance members 20, 22 and 24 and the support means 28 and 30 to which they are connected occurs primarily, if not entirely, at joints 30, 32, 34, 36, 38 (and 40, 42, not shown) as opposed to along the length of the compliance members. Major motion protions are known in the art and are shown and fully described in U.S. Pat. No. '001.

Rotational portion 18 includes compliance members 50, 52 (and 54 not shown) interconnected between intermediate support member 30 and base 56 of gripper 14 by means of joints 58, 60, 62, 64 (and 66, 68, not shown). Compliance members 50, 52 are also typically circumferentially spaced and symmetrically arranged about axis 26 in keeping with the usual RCC design. Base 56 includes a central joint 70 which pivotably interconnects suspended gripper fingers 72, 74 (and 76, not shown) which hold a workpiece or tool 80.

Attached to central joint 70 is spring 82 including an upper rod 84 that interconnects with piston 90 in cylinder 92, which is drawn upwardly in the direction of arrow 94 by application of a negative pressure or vacuum to conduit 96. Alternatively, a positive pressure drive system could be used. Normally there is no vacuum applied at conduit 96, spring 82 is not tensed, and fingers 72, 74, and 76 are in a relaxed state. Joints 32, 34, 36, 38, 40, 42, 58, 60, 62, 64, 66 and 68 are relaxed, not tense. Therefore, compliance members 50, 52 and 54 do not lie along conical radii 100, 102 (and 104, not shown). In this condition, translational portion 16 and rotational portion 18 do not establish a remote center of compliance. However, upon an application of vacuum to conduit 96, piston 90 moves upward in the direction of arrow 94, tensing spring 82 and thereby pulling the tips of fingers 72, 74, and 76 inwardly to grip workpiece or tool 80 and fixing base 56, whereby RCC device 12 is erected. Compliance members 50, 52, and 54 lie along conical radii 100, 102 (and 104, not shown) from first motion center 110, which constitutes the remote center of compliance located at the tip of workpiece or tool 80. The integral construction of gripper mechanism 14 and its base 56 as a lower support plate in RCC device 12 provides the integral RCC device-gripper mechanism structure that enhances the location of remote compliance center 110 at the end of workpiece or tool 80 close to RCC device 12.

Figure 3:
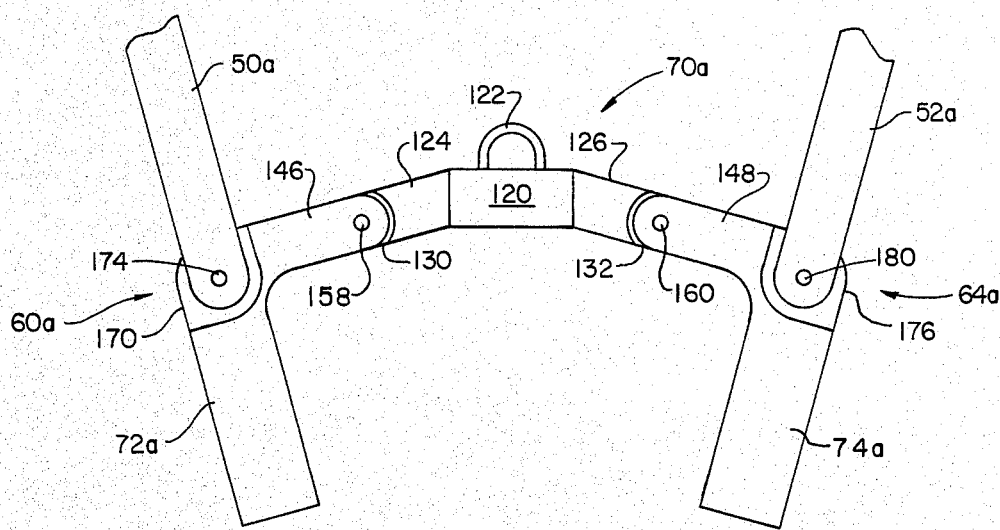
FIG. 3 is a side elevational view of the gripper portion of FIG. 2.

In one embodiment, central joint 70a, FIGS. 2 and 3, includes a central section 120 with an eye 122 for receiving the lower end of spring 82, FIG. 1. Arms 124, 126, 128, FIG. 2 and 3, extend from central section 120 and include tongues 130, 132, 134, which engage slots 136, 138, and 140 in the upper part 146, 148, 150 of fingers 72a, 74a (and 76a, not shown); the pivot joints 152, 154, 156 thus formed are held together by pivot pins 158, 160, 162.

Joints 60a, 64a and 68a are formed in the same manner: tongue 170 is held in pivotable engagement with slot 172 by means of pivot pin 174; tongue 176 is held in pivotable engagement with slot 178 by pivot pin 180; tongue 182 is held in pivotable engagement with slot 184 by pin 186.

Figure 4:
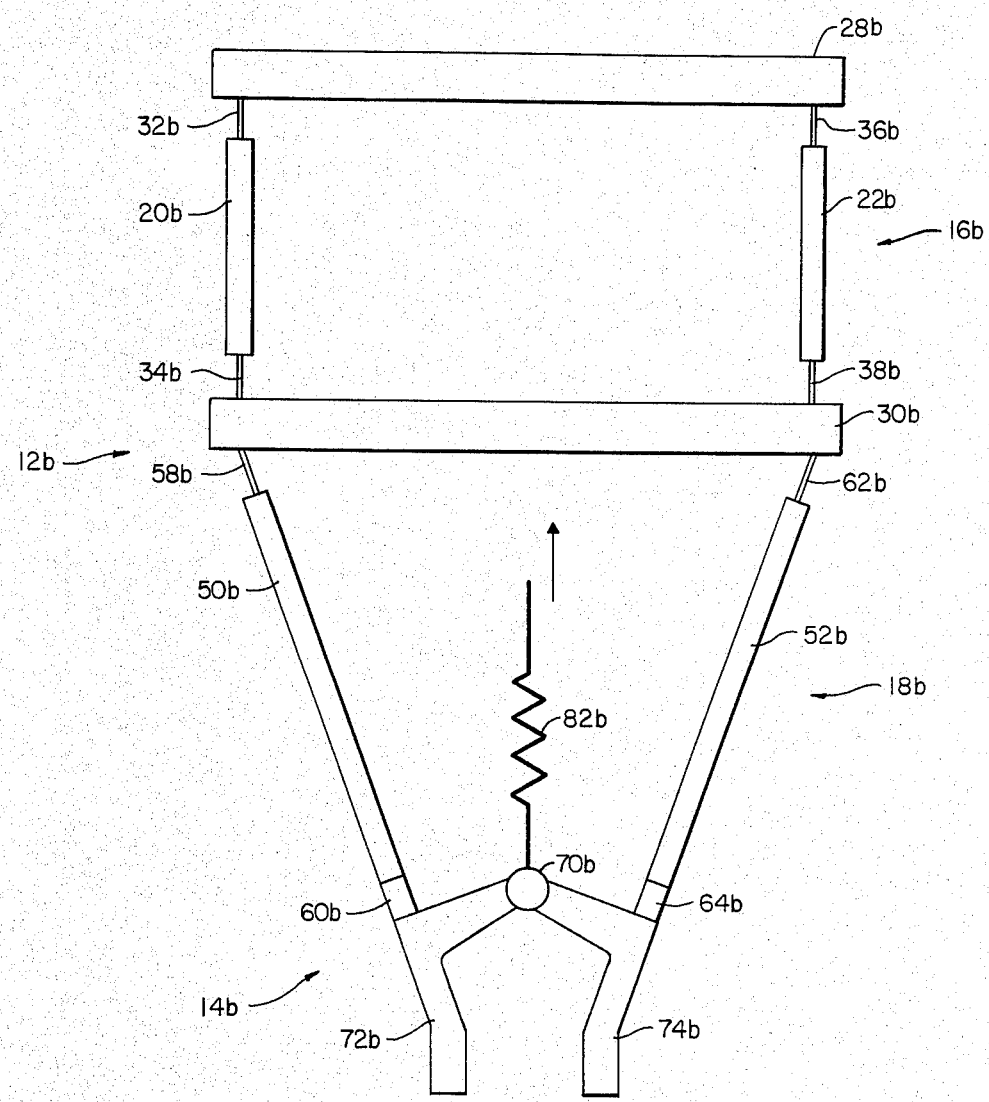
FIG. 4 is a view similar to FIG. 1 in which all but the finger joints and central joint are implemented with flexures.

The form of the joints used at various places in the RCC gripper system is not limited to pivot mechanisms. For example, as shown in FIG. 4, the joints may be implemented by flexures 32b, 34b, 36b, 38b (and 40b, 42b, not shown) in translational portion 16b. In rotational portion 18b, the joints may be implemented by flexures 58b, 62b (and 66b, not shown) while pivot mechanisms may be maintained to implement joints 60b, 64b (and 68b, not shown) and central joint 70b. Also as shown in FIG. 4, spring 82b may be subjected to a force directly rather than through an assembly of piston 90 and cylinder 92 powered by a pneumatic or power drive through conduit 96. In fact, spring 82b may be eliminated entirely in favor of a simple, direct link which may be pulled on to fix or lock fingers 72b, 74b (and 76b, not shown) on a workpiece or tool. In another alternative the force applied to central joint 70 may be applied in the opposite direction to lock or fix the mechanism and erect the RCC device with the jaws in the open position.

Figure 5:
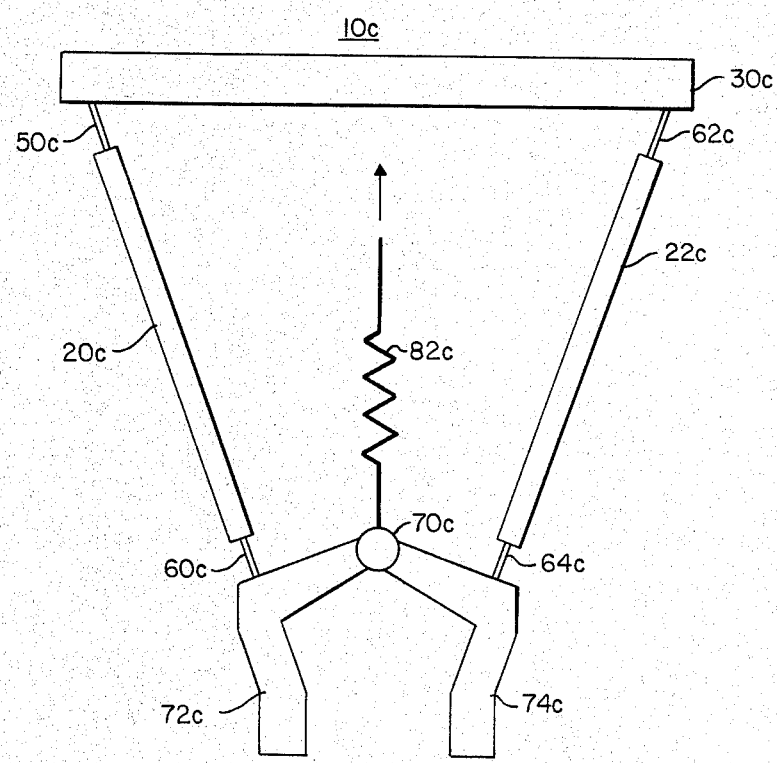
FIG. 5 is a view of a portion of the device of FIG. 4 in which all but the central joint are implemented with flexures.
Figure 6:
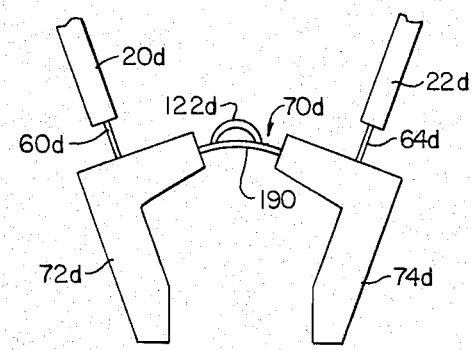
FIG. 6 is a view of a portion of FIG. 5 with the finger joints and central joint implemented with flexures.

Flexures 60c, 64c, FIG. 5, may also be used at the lower end of compliance members 20c, 22c to implement joints 60b, 64b, FIG. 4. In fact, flexures may also be used for central joint 70d, FIGS. 6, 6A. Central joint 70d may include a metal flexure 190 including a central section 192 and three arms 194, 196, 198, which engage with fingers 72d, 74d (and 76d, not shown).

An RCC gripper system of this invention 10e according to this invention may also be implemented with an RCC device 12e of the second type referred to above in combination with gripper mechanism 14e, FIG. 7. In accord with the design of the second type of RCC device, compliance members 20e, 22e, (and 24e, not shown) are compliant throughout their extent and are attached at their lower ends to base 56e at fingers 72e, 74e (and 76e, not shown). At their upper ends, compliant members 20e, 22e (and 24e, not shown) are interconnected with support member 200. The center section 202 of support member 200 is interconnected with an assembly machine or similar device through arm 204. Between center section 202 and the outer portion 206 of support member 200 there are second deformable means 208. These second deformable means produce a center of motion somewhere in the area of central section 202. Compliant members 20e, 22e, (and 24e, not shown) lie along conical radii 210, 212 (and 214, not shown) from a second center of motion 216. As a result the remote compliance center 218 occurs at the tip of workpiece or tool 80e. In FIG. 7 the lower ends of compliant members 20e, 22e (and 24e, not shown) include joints 60e, 64e (and 68e, not shown) which interconnect with base 56e of gripper mechanism 14e. However, this is not necessary as the compliant members 20e, 22e (and 24e, not shown) may interconnect directly with base 56e.

Figure 6A:
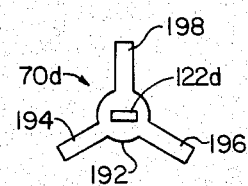
FIG. 6A is a plan diagram of a flexure usable in the central joint of FIG. 6.

Such a construction is shown in FIG. 8, where compliant member 22f is connected at its upper end directly to support member 206f and at its lower end directly to base 56f. In FIG. 8, compliant member 22f is formed of a plurality of rubber, 220 and steel, 222, laminations. In this construction too, the central joint may be formed of a flexure 70g, FIG. 9, in the same manner as indicated in Fig. 6A.

Other embodiments will occur to those skilled in the art and are within the following claims:

What is claimed is:

1. A remote center compliance (RCC) gripper system comprising:
    support means;
    at least three compliance members mounted to said support means and disposed along conical radii from a focus;
    an articulated gripper mechanism interconnected with one end of said compliance members and including a base having a generally centrally disposed joint and having a plurality of fingers extending from siad base; and
    means for applying a force between said centrally disposed joint and said support means to fix said joint and apply a force to said compliance members.

2. The system of claim 1 in which said joint includes a pivot mechanism.

3. The system of claim 1 in which said joint includes a flexure.

4. The system of claim 1 in which each said compliance member is interconnected with said base proximate said finger.

5. The system of claim 4 in which each compliance member proximate the base includes a finger joint interconnected with said base.

6. The system of claim 5 in which said finger joint includes a pivot mechanism.

7. The system of claim 1 in which each said compliance member includes a major motion portion at each end.

8. The system of claim 1 in which each said compliance member is a deformable element.

* * * * *